Patented Feb. 8, 1944

2,341,294

UNITED STATES PATENT OFFICE 2,341,294

TERPENE DERIVATIVES

Alfred L. Rummelsburg, Wilmington, Del., assignor to Hercules Powder Company, Wilmington, Del., a corporation of Delaware No Drawing. Application May 31, 1941,
Serial No. 396,222

15 Claims. (Cl. 260—92.6)

This invention relates to a new series of terpene derivatives and more particularly to a new series of terpene derivatives resulting from the reaction of various amines with an acyclic terpene having three double bonds per molecule. Hereinafter, in this specification an acylic terpene having three double bonds per molecule will be referred to for convenience as an acyclic terpene.

By the method in accordance with this invention, a primary or secondary amine is reacted with an acyclic terpene, a polymerized acyclic terpene, at an elevated temperature for a period designed to promote substantially complete reaction. An acid condensation catalyst will be employed under conditions to be hereinafter described. The resulting products are, in general, dark colored, viscous oils and resins which find particular use as accelerators in the vulcanization of rubber and as intermediates in the preparation of vulcanization accelerators.

In accordance with this invention any acyclic terpene of the empirical formula $C_{10}H_{16}$, having three double bonds per molecule, may be employed. Thus, allo-ocimene, ocimene or myrcene may be employed. In particular, it is preferred to employ allo-ocimene. This particular acyclic terpene, in addition to having three double bonds, has them in a triply conjugated position in the molecule.

As stated hereinabove, the acyclic terpenes may, if desired, be employed in polymeric form. To obtain the polymeric forms from the monomers any of the processes known in the art are contemplated. Thus, for example, in the case of allo-ocimene, it is desired to include allo-ocimene polymerized with phosphoric acid catalysts, such as, orthophosphoric acid, tetraphosphoric acid, hypophosphoric acid, metaphosphoric acid, pyrophosphoric acid, etc.; metal halide catalysts, such as, stannic chloride, aluminum chloride, zinc chloride, boron trifluoride and its molecular complexes with ethers and acids, etc.; acids, such as, sulfuric, hydrofluoric, p-toluene sulfonic acid, etc.; and adsorbents, such as, fuller's earth, bauxite, silica gel, alumina, activated magnesium silicates, etc. The polymerization may be carried out with or without the use of an inert, volatile, organic solvent, such as, benzene, xylene, gasoline, ethylene dichloride, etc. For additional information relating to particular procedures which may be employed, see my copending applications for United States Letters Patent, Serial No. 370,664, filed December 18, 1940, and Serial No. 370,665, filed December 18, 1940.

Of the various polymeric forms of acyclic terpenes, the substantially pure dimer will preferably be employed in the condensation with the desired amine in accordance with this invention. Thus, for example, when allo-ocimene is polymerized in the presence of a phosphoric acid catalyst, a liquid product is formed consisting of a substantial quantity of the dimer. It has been found that the liquid product, after removal of the catalyst, will contain from about 75% to about 95% of the dimer, depending upon the conditions of reaction, such as, type of phosphoric acid employed, the concentration of catalyst, the particular solvent, the reaction temperature, etc. The thiocyanate value of the product may vary from about 120 to about 240.

If desired, the product may be distilled prior to use, preferably in vacuo and over a small amount of alkali. Thereby, traces of higher polymers, catalysts and oxidation products present as impurities can be removed. The pure dimer has the following characteristics:

B. P. (4 mm.) _____°C___ 142–143
$d_0^{23}$ _____ 0.8654
$n_d^{23}$ _____ 1.508

In carrying out the polymerization with metal halide catalysts, liquid polymers may also be obtained following the procedure of my application for United States Letters Patent, Serial No. 370,-664, filed December 18, 1940; however, by employing particular metal halides and suitably controlling the conditions of reaction, solid polymers of allo-ocimene can result. For example, when a metal chloride, and preferably aluminum chloride, is used, generally solid polymers result. Preferably, however, to form solid polymers the reaction is carried out between about −35° C. and about 60° C. with the allo-ocimene dissolved in a halogenated organic solvent, such as, ethylene dichloride, etc. These solid polymers contain at least about 75% of polymeric constituents higher than the dimer and are further characterized by having thiocyanate values between the range of from about 20 to about 80.

The amines which may be employed in accordance with the invention comprise both primary and secondary amines, and both aliphatic and aromatic amines. For example, aromatic primary amines, such as, aniline, toluidine, phenylenediamine, naphthylamine, amino-biphenyl, xylidine, mesidine, cumidine, benzylamine, phenylethylamine, etc.; aromatic secondary amines, such as, methylaniline, ethylaniline, propylaniline, butylaniline, amylaniline, methyltoluidine, ethyltoluidine, etc.; aliphatic primary amines, such as, methylamine, ethylamine, propylamine, butylamine, amylamine, ethylenediamine, hexamethylenediamine, dimethylamine, isopropylamine, monoethanolamine, diethanolamine, triethanolamine, monoisopropanolamine, etc.; aliphatic secondary amines, such as, dimethylamine, diethylamine, methylethylamine, etc., may be employed. Generally, the secondary amines react less readily than do the primary amines; hence, where secondary amines are employed, higher temperatures and longer periods of reaction are required. Furthermore, aliphatic amines generally react less readily than do the aromatic amines, hence where aliphatic amines are employed, higher temperatures and longer periods of reaction are required.

In preparing the condensation product of a monomeric or polymeric acyclic terpene with a desired amine, the reactants are heated together, preferably with agitation, in the presence of an acid condensation catalyst at a temperature within the range of from about 150° C. to about 250° C. for a period of from about 1 hour to about 24 hours. Preferably, a temperature within the range of from about 175° C. to about 225° C. for a period of from about 6 hours to about 10 hours will be used. The use of a closed system is necessary if a reaction temperature appreciably above 130° C. is employed. Also, if the boiling point of the particular amine is too low to permit the desired reaction temperature, a closed system is required.

With respect to the acyclic terpene, the amine may be employed in equi-molar or other than equi-molar proportions, although in the reaction which ensues it is believed equi-molar proportions of the materials react. Moreover, it is preferred to employ the amine in an amount corresponding with between about a 25% and about a 100% excess of equi-molar proportions. The acid condensation catalysts which will be employed comprise hydrochloric acid, sulfuric acid, orthophosphoric acid, tetraphosphoric acid, fluoboric acid, hydrofluoric acid, perchloric acid, trichloracetic acid, chloraluminic acid, aromatic sulfonic acids, such as, p-toluene sulfonic acid, etc. Equivalently, the various amine salts of the aforesaid acids may be employed as catalysts, for example, aniline hydrochloride, etc. In addition, it has been found that metal halides, such as, zinc chloride, will accomplish the desired result, but are not as desirable as the aforementioned catalysts. The amount of catalyst employed will be not greater than about 15% based on the combined weight of the reactants. Preferably, the amount of catalyst employed will be within the range of from about 0.5% to about 10% based on the combined weight of the reactants. These ranges are based on the aforesaid acid catalysts, or as the case may be, metal halide catalysts. If an amine salt of an acid is employed as catalyst, correspondingly large quantities will be employed.

Following the reaction period, the mixture will be suitably treated to remove the excess amine. For example, in the case of aniline, the mixture may be either steam or vacuo distilled to remove the excess aniline. The catalyst may be removed either prior to or after removal of the excess amine, but it is preferably removed prior to removal of excess amine. This catalyst removal will preferably be accomplished by a combination of caustic washing and water washing.

Inert solvents may be employed if desired during the condensation and/or during the purification of the products. They may comprise benzene, toluene, gasoline, cyclohexane, decahydronaphthalene, chlorobenzene, ethylene dichloride, chloroform, etc. The use of an inert solvent will reduce the viscosity and permit adequate contact.

The reaction products of this invention are in general dark colored viscous oils and resins. They are characterized by containing between about 3.0% and about 10.0% of combined nitrogen.

There follow several examples which illustrate specific embodiments of the processes of this invention which, however, are not to be taken as being limiting. All parts and percentages in this specification and claims attached are by weight unless otherwise indicated.

*Example 1*

One hundred and thirty-six parts of 98% allo-ocimene, 120 parts of aniline and 5 parts of aniline hydrochloride were refluxed for 7 hours at 190 to 200° C. The reaction mixture was then diluted with 100 parts of benzene, and the resulting solution was washed with 200 parts of aqueous 10% sodium hydroxide solution. The solution was afterwards washed with water. The benzene and unreacted constituents were then removed by vacuum distillation at 10 mm. using a final bath temperature of 125° C. There remained 135 parts of a dark colored viscous resin which upon analysis was found to contain 5.0% nitrogen. A Rast molecular weight determination gave 185 as compared with a theoretical of 229 for the condensation product of equi-molar proportions of allo-ocimene and aniline.

*Example 2*

Five hundred parts of 98% allo-ocimene were agitated for a period of 20 hours with 200 parts of 85% orthophosphoric acid at 25° C. to 35° C. The reaction mixture was water washed, then washed with 600 parts of an aqueous sodium hydroxide solution, and again water washed. The product was distilled at 3 to 5 mm., and the fraction coming over at 140° C. to 170° C. collected. This product was the substantially pure dimer of allo-ocimene. It had a molecular weight as determined by the Rast method of 270 and a thiocyanate number of 185.

Two hundred and seventy-two parts of the above substantially pure dimer, 150 parts of toluidine (commercial) and 10 parts of toluidine hydrochloride were heated at 205° C. under a reflux condenser in an atmosphere of $CO_2$ for 12 hours. The reaction mixture was dissolved in 400 parts of xylene and the resulting solution washed with 500 parts of an aqueous 10% NaOH solution and then washed with water. The product was then vacuum distilled to remove solvent and unreacted constituents, using a final bath temperature of 180° C. and a pressure of 5 mm. There remained 290 parts of a dark colored viscous resin which upon analysis was shown to contain 3.2% nitrogen. A Rast molecular weight determination gave 345 as compared with a theoretical of 379 for the condensation product of equi-molar proportions of dimeric allo-ocimene and toluidine.

*Example 3*

To 272 parts of 99% allo-ocimene were added 150 parts of n-butyl amine and 15 parts of the n-butyl amine salt of sulfuric acid and the mixture heated at 210° C. in a stainless steel autoclave for a period of 18 hours. The reaction mixture was washed with aqueous 10% NaOH and finally with water. Then it was distilled at 5 mm. to remove unreacted constituents until a bath temperature of 150° C. was reached. A viscous oil remained in the amount of 200 parts which contained 3.6% nitrogen. A Rast molecular weight determination gave 170 as compared with a theoretical of 209 for a condensation product of equi-molar proportions of allo-ocimene and n-butyl amine.

In addition to the methods of purifying the products of the invention, hereinbefore mentioned, further refinements may be employed, such as, treatment with a suitable activated adsorbent, such as, activated carbon, fuller's earth, bauxite, silica gel, alumina, magnesium silicates, etc. The use of an inert atmosphere, such as, $CO_2$, $N_2$, etc., during the reaction will assist in obtaining products of improved color.

The products of the invention are particularly useful as accelerators in the vulcanization of rubber, and as intermediates in the preparation of vulcanization accelerators. They may also be employed as modifiers in the preparation of aromatic amine-formaldehyde resins. Upon sulfonation with the usual sulfonating agents, the condensation products of this invention, particularly those containing aromatic groups, are converted in materials having wetting, emulsifying and detersive properties. The alkali metal salts of the sulfonation products have similar properties.

It will be understood that the details and examples hereinbefore set forth are illustrative only and that the invention as broadly described and claimed is in no way limited thereby.

What I claim and desire to protect by Letters Patent is:

1. A reaction product of a material selected from the group consisting of primary and secondary amines, and a material selected from the group consisting of acyclic terpenes, and polymerized acyclic terpenes, said acyclic terpenes having three double bonds per molecule, said reaction being carried out at a temperature within the range from about 150° C. to about 250° C., in the presence of an acid condensation catalyst.

2. A reaction product of a primary aromatic amine and allo-ocimene, said reaction being carried out at a temperature within the range from about 150° C. to about 250° C., in the presence of an acid condensation catalyst.

3. A reaction product of aniline and allo-ocimene, said reaction being carried out at a temperature within the range from about 150° C. to about 250° C., in the presence of an acid condensation catalyst.

4. A reaction product of a primary aromatic amine and polymerized allo-ocimene, said reaction being carried out at a temperature within the range from about 150° C. to about 250° C., in the presence of an acid condensation catalyst.

5. A reaction product of a primary aromatic amine and dimeric allo-ocimene, said reaction being carried out at a temperature within the range from about 150° C. to about 250° C., in the presence of an acid condensation catalyst.

6. A reaction product of aniline and dimeric allo-ocimene, said reaction being carried out at a temperature within the range from about 150° C. to about 250° C., in the presence of an acid condensation catalyst.

7. A process for making a new composition of matter which comprises reacting a material selected from the group consisting of primary and secondary amines with a material selected from the group consisting of acyclic terpenes and polymerized acyclic terpenes, said acyclic terpenes having three double bonds per molecule, at a temperature within the range from about 150° C. to about 250° C., in the presence of an acid condensation catalyst.

8. The process for making a new composition of matter which comprises reacting a primary aromatic amine with allo-ocimene, at a temperature within the range of from about 150° C. to about 250° C., in the presence of an acid condensation catalyst.

9. The process for making a new composition of matter which comprises reacting a primary aromatic amine with polymerized allo-ocimene, at a temperature within the range of from about 150° C. to about 250° C., in the presence of an acid condensation catalyst.

10. The process for making a new composition of matter which comprises reacting a primary aromatic amine with allo-ocimene at a temperature within the range of from about 150° C. to about 250° C., for a period of from about 1 hour to about 24 hours, in the presence of an acid condensation catalyst.

11. The process for making a new composition of matter which comprises reacting a primary aromatic amine with polymerized allo-ocimene at a temperature within the range of from about 150° C. to about 250° C., for a period of from about 1 hour to about 24 hours, in the presence of an acid condensation catalyst.

12. The process for making a new composition of matter which comprises reacting a primary aromatic amine with allo-ocimene at a temperature within the range of from about 175° C. to about 225° C., for a period of from about 6 hours to about 10 hours, in the presence of an acid condensation catalyst.

13. The process for making a new composition of matter which comprises reacting a primary aromatic amine with polymerized allo-ocimene at a temperature within the range of from about 175° C. to about 225° C., for a period of from about 6 hours to about 10 hours, in the presence of an acid condensation catalyst.

14. A reaction product of an aliphatic primary amine and allo-ocimene, said reaction being carried out at a temperature within the range from about 150° C. to about 250° C., in the presence of an acid condensation catalyst.

15. A reaction product of n-butyl amine and allo-ocimene, said reaction being carried out at a temperature within the range from about 150° C. to about 250° C., in the presence of an acid condensation catalyst.

ALFRED L. RUMMELSBURG.